(12) United States Patent  
Meldeau

(10) Patent No.: US 8,512,142 B2  
(45) Date of Patent: Aug. 20, 2013

(54) GAME CONTROLLER HAVING A STEPPING EXERCISE PLATFORM AND A SLIDING PLATFORM

(76) Inventor: William B. Meldeau, Jensen Beach, FL (US)

( * ) Notice: Subject to any disclaimer, the term of this patent is extended or adjusted under 35 U.S.C. 154(b) by 231 days.

(21) Appl. No.: 12/926,653

(22) Filed: Dec. 2, 2010

(65) Prior Publication Data

US 2011/0207534 A1  Aug. 25, 2011

Related U.S. Application Data

(60) Provisional application No. 61/307,968, filed on Feb. 25, 2010.

(51) Int. Cl.
 *G06F 19/00* (2011.01)
(52) U.S. Cl.
 USPC ............ 463/39; 463/36; 463/43; 482/51; 482/52; 482/70; 482/71; 482/123; 482/146
(58) Field of Classification Search
 USPC .............. 463/36, 39, 43; 482/51, 52, 70, 482/71, 123, 146
 See application file for complete search history.

(56) References Cited

U.S. PATENT DOCUMENTS

| 5,322,490 | A  | * | 6/1994 | Van Der Hoeven | 482/51 |
| 5,593,370 | A  | * | 1/1997 | Meldeau | 482/51 |
| 2006/0135329 | A1 | * | 6/2006 | Owen | 482/123 |
| 2008/0261696 | A1 | * | 10/2008 | Yamazaki et al. | 463/39 |
| 2009/0111670 | A1 | * | 4/2009 | Williams | 482/146 |

* cited by examiner

*Primary Examiner* — Omkar Deodhar  
*Assistant Examiner* — Adetokunbo O Torimiro  
(74) *Attorney, Agent, or Firm* — Welsh Flaxman & Gitler LLC

(57) ABSTRACT

A game controller includes a plurality of load sensors for detecting a load applied on an exercise support board having at least one stepping exercise platform and attached thereto a sliding platform having concave sides on which player's legs are ridden The game controller transmits a load value detected as manipulation data by the load sensors to a game machine. The game machine determines a necessary quantity of load values, and the game machine computes the necessary quantity of load values based on the detected load value from the game controller. Subsequently, game processing is performed based on the necessary quantity of computed load values on either the stepping exercise portion or the sliding exercise portion.

13 Claims, 1 Drawing Sheet

GAME CONTROLLER HAVING A STEPPING EXERCISE PLATFORM AND A SLIDING PLATFORM

CROSS REFERENCE TO RELATED APPLICATION

This application claims the benefit of U.S. Provisional Patent Application Ser. No. 61/307,968, entitled "GAME CONTROLLER HAVING A STEPPING EXERCISE PLATFORM AND A SLIDING PLATFORM", filed Feb. 25, 2010.

BACKGROUND OF THE INVENTION

1. Field of the Invention

The present invention relates to a game controller, a storage medium storing a game program, and a game apparatus, and particularly to the game controller including a plurality of load sensors, the storage medium storing a game program for performing game processing with the game controller, and the game apparatus.

2. Description of the Related Art

United States Patent Application Publication No. 2008/0261696 to Yamazaki et al discloses a game controller used in a game machine, comprising: a support portion on which player's legs are ridden; at least four load sensors disposed at predetermined intervals below said support portion; and a communication means for transmitting a load value as manipulation data detected from each of said four load sensors to said game machine. The support portion as displayed in this patent is a flat surface which is not capable of supporting sliding exercise computations.

U.S. Pat. No. 5,593,370 to Meldeau discloses a stepping exercise device and a sliding exercise device having at least one stepping exercise platform having a base for placement on a support surface, an upper stepping surface having a front and rear end raised above said support surface and an exterior angular side surface extending from one end of said upper stepping surface; and a sliding surface having opposite ends and a central sliding area to be supported on said support surface and having at least one of said opposite ends removably connected to said stepping exercise platform and interfacing with said exterior angular side surface of said stepping exercise platform; said sliding surface extending downwardly from said upper stepping surface to said support surface.

There are no current gaming controllers that allow the sensing of a sliding motion to be used in conjunction with aerobic exercises.

SUMMARY OF THE INVENTION

In view of the foregoing, an object of the present invention is to provide a novel game controller.

Another object of the present invention is to provide a game controller that can perform various manipulations using load sensors.

Still another object of the present invention is to provide a novel storage medium storing a game program, in which a game controller including a plurality of load sensors is used to sense sliding action of an individual, and a game apparatus.

Still another object of the present invention is to provide a storage medium storing a game program, which can compute a quantity of load values necessary for game processing to perform game processing using a game controller including a plurality of load sensors, and a game apparatus.

In the present invention, the following configurations are adopted to solve the problems. A parenthetic reference numeral and supplementary explanation indicate correlation with the later-described embodiments for the purpose of the easy understanding of the present invention, and do not restrict the present invention.

In a first aspect of the present invention, a game controller used in a game machine, includes a support portion on which player's legs are ridden; load sensors are disposed at predetermined intervals below the support portion; and a communication means for transmitting a load value as manipulation data detected from each of the load sensors.

In the first aspect of the present invention, the game controller (10) consists of an exercise platform and is used as the manipulation means or input means of a game machine (not shown). The game controller includes the support portion (16) on which the player's legs are ridden, and load sensors (14) are disposed at predetermined intervals below the support portion. The load applied by the player ride on the support portion is detected by the load sensors. Communication means as disclosed in United States Patent Application Publication No. 2008/0261696 transmits the load value as the manipulation data detected from each of the load sensors. Accordingly, in the game machine, the game can be performed based on the load values detected by the load sensors.

According to the first aspect of the present invention, load sensors are provided on the concave upslope of the sliding surface, and the load value as the manipulation data detected from each of the load sensors is transmitted to the game machine, so that the game controller that can perform various manipulations using the load applied by the player can be provided.

According to the second aspect of the present invention, load sensors are provided on the step portion of the exercise apparatus, and the load value as the manipulation data detected from each of the load sensors is transmitted to the game machine, so that the game controller that can perform various manipulations using the load applied by the player can be provided.

In another aspect of the present invention, preferably a game controller according to the first aspect of the present invention further includes a power supply unit that supplies electric power to the load sensor; and a power supply control means for controlling power supply from the power supply unit to the load sensor, wherein the communication means includes a reception determining means for determining whether or not a load obtaining command is received from the game machine, the power supply control means supplies electric power from the power supply unit to the load sensor when the reception determining means determines that the load obtaining command is received, and the power supply control means stops electric power supply from the power supply unit to the load sensor when the reception determining means determines that the load obtaining command is not received.

Another aspect of the present invention is a game controller according to the first aspect of the present invention, preferably the communication means includes a wireless communication unit receiving wirelessly the load obtaining command from the game machine; and a processing means for imparting the load value as the manipulation data detected from each of the load sensors to the wireless communication unit when the wireless communication unit receives the load obtaining command, and the wireless communication unit wirelessly transmits the manipulation data received from the processing means to the game machine.

In another aspect of the present invention, the wireless game controller that can wirelessly transmit and receive the data to and from the game machine can be provided.

According to the present invention, the load of the player is detected by load sensors and the detected load value is set to the manipulation data to perform the game processing, so that the game controller that can perform various manipulations using the load sensors can be provided.

The necessary quantity is determined and the necessary quantity of load values is computed, so that various quantities of load values can be used in the game processing by various combinations of values of the plural load sensors. Accordingly, a novel game played by the load of the player using the game controller including the plurality of load sensors can be proposed.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as the basis for the claims and as a basis for teaching one skilled in the art how to make and/or use the invention.

For the purposes of the present invention, the combined sliding and stepping apparatus can be used in place of the game controller identified as numeral (10) as displayed in the interactive gaming system as disclosed in United States Patent Application Publication No. 2008/0261696 to Yamazaki et al, which is hereby incorporated by reference in its entirety, and commonly referred to as a "Wii Fit".

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
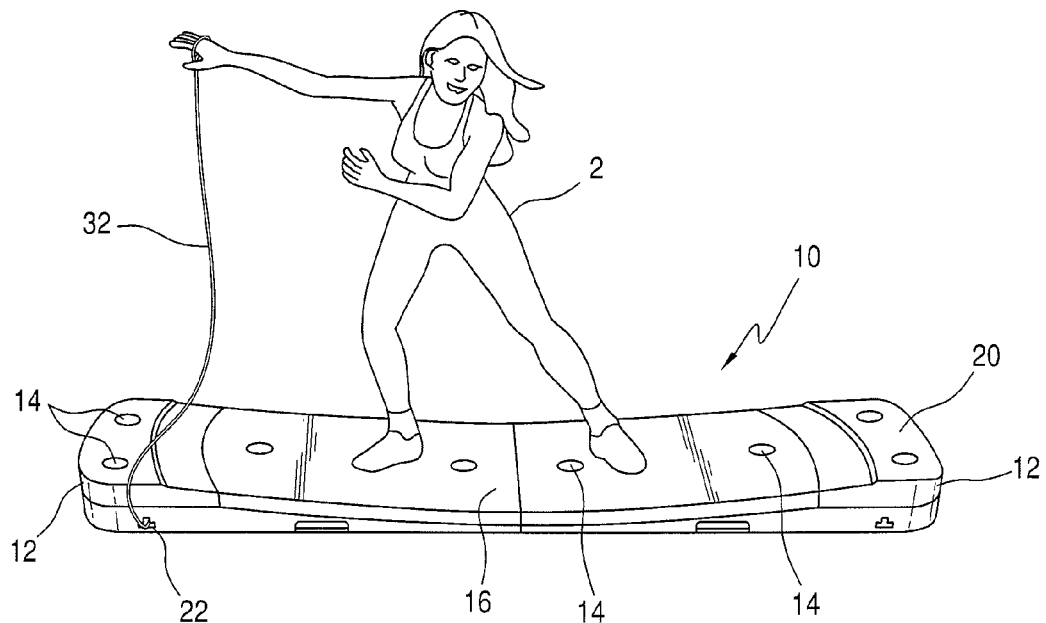
FIG. 1 is a perspective view showing an appearance of a game controller according to an embodiment of the present invention.
Figure 2:
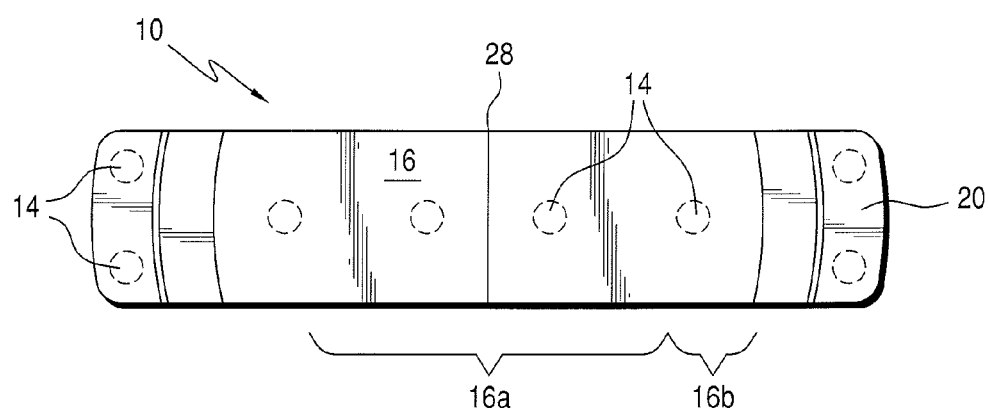
FIG. 2 is a top view showing the game controller shown in FIG. 1.

Referring to the drawings of the present invention, FIG. 1 shows a controller in the form of a combination step and slide exerciser 10 which may be used for interactive aerobic exercising whereby a user 2 can step upwardly and downwardly, and/or slide on the top of the exerciser 10 in conjunction with an interactive gaming system. An elevated step platform 12 is located at each end of the step and slide exerciser 10. A slider section 16, having a central sliding area 16a (FIG. 2) and slightly concave ends 16b (FIG. 2), is connected between opposite sides of the stepping platforms 12 whereby the user may slide in the area between these platforms 12.

Preferably each step platform 12 has an uppermost foot engaging, stepping area 20 which is generally rectangular or recto-semicircular in configuration and a side surface 24 which is angular with respect to the top stepping area 20 and the lowest area of the slider section 16. Pluralities of load sensors 14 are located in both the stepping area 20 and the slider section 16 and are installed and utilized in accordance with the structure and procedure as displayed in United States Patent Application Publication No. 2008/0261696 to Yamazaki et al.

The central sliding area 16 is preferably divided into equal two section along seam 28 includes a hinge 42 on the bottom for use in folding the exerciser 10 in half during storage. The exerciser can optionally have latching means (not shown) to secure both halves of the exerciser 10 when folded during storage.

In use, when one wishes to exercise with the apparatus of the invention, the exerciser 10 is unhinged by opening and positioned flatly on the ground allowing a user to smoothly glide over the top of the central sliding area 16 thereof when exercising. It will be appreciated that a user may step up and down on each of the steps 12 and also step inwardly onto the sliding area 16 for sliding movement thereon. Thus, the exercise equipment of the present invention combines the features of an aerobic stepping device with an aerobic sliding device, enabling a user to work an exercise program whereby both a stepping motion and sliding motion type of exercise may be performed without the necessity of using multiple exercise apparatus. In a further embodiment an elastic strap 32 can be secured into a locking channel 22 to permit additional exercising movements.

With further reference to FIG. 1, a game controller exerciser 10 according to an embodiment of the present invention is a manipulation device or input device for game. The step and slide exerciser 10 is a game controller board on which a player rides or slides with the board containing load sensors 14 that detect loads applied on the board. The load sensors 14 are accommodated in the board, and a possible arrangement of the load sensors 14 is shown by dotted line in FIG. 2.

In the stepping area 20, multiple load sensors 14 are arranged at predetermined intervals. In the preferred embodiment, the four load sensors 14 are arranged in peripheral portions of the stepping area 20, specifically, at the four corners. The interval between the load sensors 14 is set an appropriate value such that player's intention can accurately be detected for the load applied to the board in a game manipulation. Similarly, multiple load sensors 14 are preferably placed in along the lengthwise center axis of the central slider area 16.

As displayed in United States Patent Application Publication No. 2008/0261696, the load sensors 14 are formed by, e.g., a strain gage (strain sensor) type load cell, and the load sensor 14 is a load transducer that converts the input load into an electric signal. In the load sensor 14, a strain inducing element is deformed to generate a strain according to the input load. The strain is converted into a change in electric resistance by a strain sensor adhering to the strain inducing element, and the change in electric resistance is converted into a change in voltage. Accordingly, the load sensor 14 outputs a voltage signal indicating the input load from an output terminal when the voltage is imparted to the load sensor 14 from a power supply terminal. The load sensor 14 is formed by, e.g., a strain gage (strain sensor) type load cell, and the load sensor 14 is a load transducer that converts the input load into an electric signal. In the load sensor 14, a strain inducing element is deformed to generate a strain according to the input load. The strain is converted into a change in electric resistance by a strain sensor adhering to the strain inducing element, and the change in electric resistance is converted into a change in voltage. Accordingly, the load sensor 14 outputs a voltage signal indicating the input load from an output terminal when the voltage is imparted to the load sensor 14 from a power supply terminal. Other types of load sensors such as a folk vibrating type, a string vibrating type, an electrostatic capacity type, a piezoelectric type, and gyroscope type may be used as the load sensor 14.

Figure 3:
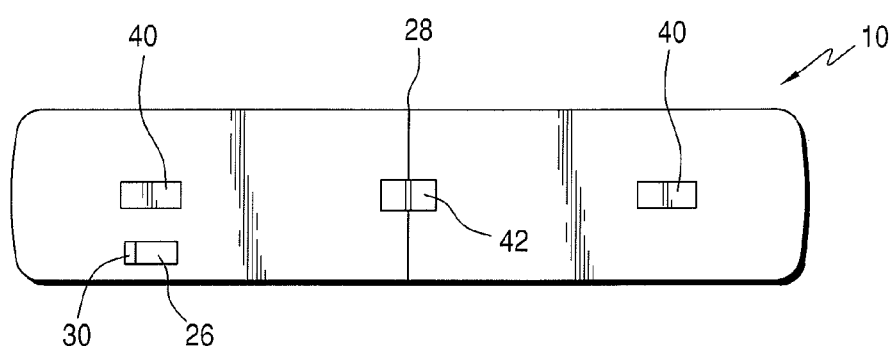
FIG. 3 is a bottom view of the game controller shown in FIG. 1 with an exposed hinge.

As displayed in FIG. 3 showing the bottom surface of the game controller exerciser 10 includes a microcomputer 26 that controls an operation of the game controller exerciser 10. The microcomputer 26 includes a ROM and a RAM (not shown) and a power source 30 and controls the operation of the game controller exerciser 10 according to a program stored in the ROM. The step and slide exerciser 10 includes rubber gripping members 40 on a bottom surface thereof to engage a support surface so it will not slip when it is used.

The game controller exerciser 10 may directly be connected to a game machine using a connector or the game controller exerciser 10 may be connected to a device that can conduct communication with the game machine.

The electric power may be supplied to the load sensor 14 and the transfer of the outputs from each load sensor 14 indicating the input load, in accordance with the any of the techniques and system design displayed in United States Patent Application Publication No. 2008/0261696.

In each of the above-described embodiments, the load sensors 14 are arranged in the peripheral portion of the step platform 12 or along the central axis of the slider section 16. However, the load sensors 14 can be arranged at any predetermined intervals so as to ensure the accuracy of load detection.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A game controller used in a game machine, comprising a support portion having at least one stepping exercise platform having an uppermost foot engaging surface and extending downward therefrom a sliding platform having a length and concave sides on which a player's legs and feet are ridden; a plurality of load sensors disposed at predetermined spaced intervals below said support portion along a lengthwise center axis of the sliding platform for sensing sliding motion of the player's legs as the player's feet slide upon each spaced load sensor; and a communication means for transmitting a load value as manipulation data detected from each of said load sensors to said game machine as the player's feet slide upon each spaced load sensor.

2. The game controller according to claim 1, further comprising:
a power supply unit that supplies electric power to said load sensors; and
a power supply control means for controlling power supply from said power supply unit to said load sensor, wherein said communication means includes a reception determining means for determining whether or not a load obtaining command is received from said game machine, said power supply control means supplies electric power from said power supply unit to said load sensor when said reception determining means determines that said load obtaining command is received, and said power supply control means stops electric power supply from said power supply unit to said load sensor when said reception determining means determines that said load obtaining command is not received.

3. The game controller according to claim 1, wherein said communication means includes;
a wireless communication unit receiving wirelessly said load obtaining command from said game machine; and
a processing means for imparting the load value as the manipulation data detected from each of said load sensors to said wireless communication unit when said wireless communication unit receives said load obtaining command, and said wireless communication unit wirelessly transmits said manipulation data received from said processing means to said game machine.

4. The game controller according to claim 1, wherein said communication means includes a connector unit detachable from a different type of game controller and, and said communication means transmits said load value to said game machine through said different type of game controller attached to said connector unit.

5. The game controller according to claim 1, wherein said communication means includes:
a command determining means for determining which load obtaining command in a plurality of types of load obtaining commands is received from said game machine; and
a manipulation data computing means for computing a predetermined quantity of pieces of manipulation data according to the load obtaining command determined by said command determining means from the load value detected from each of said load sensors.

6. The game controller according to claim 1, further comprising:
a manipulation button provided in a surface different from an upper surface of said support portion to be manipulated by he player's legs.

7. The game controller according to claim 1, wherein said stepping exercise platform comprises an exercise platform having a base for placement on a support surface, an upper stepping surface having a front and rear end raised above said support surface and an exterior angular side surface extending from one end of said upper stepping surface.

8. The game controller according to claim 1, wherein said stepping exercise platform additionally comprises means for attaching elastic exercise cords.

9. The game controller according to claim 1, wherein said sliding platform has a bottom potion that is hinged in the center of the sliding platform to permit folding of the platform for storage.

10. The game controller according to claim 1, wherein the stepping exercise platform includes a load sensor therein.

11. A game controller used in a game machine, comprising a support portion having a sliding platform having a length and concave sides on which player's legs and feet are slid upon, the sliding platform being positioned between two stepping platforms; a plurality of load sensors disposed at predetermined intervals below said support portion for sensing, motion of player's legs as the player's feet slide upon each spaced load sensor; and a communication means for transmitting a load value as manipulation data detected from each of said load sensors to said game machine as the player's feet slide upon each spaced load sensor.

12. The game controller according to claim 11, wherein said sliding platform has it bottom potion that is hinged in the center of the sliding platform to permit folding of the platform for storages 13. The game controller according to claim 11, wherein the stepping platforms include a load sensor therein.

* * * * *

UNITED STATES PATENT AND TRADEMARK OFFICE
CERTIFICATE OF CORRECTION

| | | |
|---|---|---|
| PATENT NO. | : 8,512,142 B2 | |
| APPLICATION NO. | : 12/926653 | |
| DATED | : August 20, 2013 | |
| INVENTOR(S) | : William B. Meldeau | |

It is certified that error appears in the above-identified patent and that said Letters Patent is hereby corrected as shown below:

In the Claims:

Column 6, line 29, cancel the text beginning with "6. The game controller" to and ending "he player's legs", and insert the following claim:

--6. The game controller according to claim 1, further comprising: a manipulation button provided in a surface different from an upper surface of said support portion to be manipulated by the player's legs.--

Column 6, line 49, cancel the text beginning with "11. A game controller" to and ending "spaced load sensor", and insert the following claim:

--11. A game controller used in a game machine, comprising a support portion having a sliding platform having a length and concave sides on which player's legs and feet are slid upon, the sliding platform being positioned between two stepping platforms; a plurality of load sensors disposed at predetermined intervals below said support portion for sensing of sliding motion of player's legs as the player's feet slide upon each spaced load sensor; and a communication means for transmitting a load value as manipulation data detected from each of said load sensors to said game machine as the player's feet slide upon each spaced load sensor.--

Column 6, line 60, cancel the text beginning with "12. The game controller" to and ending "for storages", and insert the following claim:

--12. The game controller according to claim 11, wherein said sliding platform has it bottom portion that is hinged in the center of the sliding platform to permit folding of the platform for storages.--

Signed and Sealed this
Eighth Day of October, 2013

Teresa Stanek Rea
*Deputy Director of the United States Patent and Trademark Office*